United States Patent
Song et al.

(10) Patent No.: US 10,884,145 B2
(45) Date of Patent: Jan. 5, 2021

(54) ADJUSTABLE TRANSMISSION DEVICE FOR MEASURING TRANSVERSE PARAMETERS OF BEAMS

(71) Applicant: HEFEI CAS ION MEDICAL AND TECHNICAL DEVICES CO., LTD, Anhui (CN)

(72) Inventors: Yuntao Song, Anhui (CN); Kaizhong Ding, Anhui (CN); Yonghua Chen, Anhui (CN); Junjun Li, Anhui (CN); Yucheng Wu, Anhui (CN); Kai Yao, Anhui (CN); Lexing Hu, Anhui (CN)

(73) Assignee: HEFEI CAS ION MEDICAL AND TECHNICAL DEVICES CO., LTD, Hefei (CN)

( * ) Notice: Subject to any disclaimer, the term of this patent is extended or adjusted under 35 U.S.C. 154(b) by 0 days.

(21) Appl. No.: 16/883,519

(22) Filed: May 26, 2020

(65) Prior Publication Data
US 2020/0284926 A1 Sep. 10, 2020

Related U.S. Application Data

(63) Continuation of application No. PCT/CN2018/076126, filed on Feb. 10, 2018.

(30) Foreign Application Priority Data

Dec. 29, 2017 (CN) .......................... 2017 1 1479243

(51) Int. Cl.
*G01T 1/29* (2006.01)
*H05H 13/00* (2006.01)

(52) U.S. Cl.
CPC ......... *G01T 1/2921* (2013.01); *H05H 13/005* (2013.01)

(58) Field of Classification Search
CPC ........................... G01T 1/2921; H05H 13/005
USPC .............. 250/440.11, 441.11; 435/259, 288, 435/306.1; 356/499; 355/67
See application file for complete search history.

(56) References Cited

U.S. PATENT DOCUMENTS
2013/0162966 A1   6/2013   Beerens et al.

FOREIGN PATENT DOCUMENTS

| CN | 102279409 A | 12/2011 |
|---|---|---|
| CN | 202563097 U | 11/2012 |
| CN | 104570045 A | 4/2015 |
| CN | 106371131 A | 2/2017 |

(Continued)

*Primary Examiner* — David A Vanore
(74) *Attorney, Agent, or Firm* — Wayne & Ken, LLC; Tony Hom

(57) ABSTRACT

Disclosed is an adjustable transmission device for measuring transverse parameters of beams, including: a CCD transmission support assembly, an external transmission rod, the CCD transmission support assembly is connected with a support block, and the support block is provided with the slotted set screw with flat point, and is connected with a limit block via a first fastener; a snap ring is arranged in the rear of the external transmission and is matched with a base; the base is connected with the CCD fixed plate via a second fastener. The external transmission rod is provided with a second groove for mounting the first retaining ring, and a side of the first retaining ring is sequentially provided with a vacuum observation window, a second retaining ring, a head assembly, a retaining sleeve and a screwing mechanism.

10 Claims, 2 Drawing Sheets

(56) References Cited

FOREIGN PATENT DOCUMENTS

| | | |
|---|---|---|
| CN | 107402402 A | 11/2017 |
| CN | 107462918 A | 12/2017 |

ADJUSTABLE TRANSMISSION DEVICE FOR MEASURING TRANSVERSE PARAMETERS OF BEAMS

CROSS-REFERENCE TO RELATED APPLICATIONS

This application is a continuation of International Application No. PCT/CN2018/076126 with a filling date of Feb. 10, 2018, designating the United states, and further claims the benefit of priority from Chinese Patent Application No. 201711479243.8, filed on Dec. 29, 2017. The content of the aforementioned application, including any intervening amendments thereto, is incorporated herein by reference in its entirety.

TECHNICAL FIELD

The present application relates to cyclotron beam measurement, and more particularly to an adjustable transmission device for measuring transverse parameters of beams.

BACKGROUND

For early cyclotrons, charged particles are accelerated only once by the accelerating electric field, and the final energy of the particles is mainly limited by the high voltage technology. In isochronous cyclotrons, phases of the particles and the electric field will not be changed; the varying diameters of the circular orbit are mainly associated with the momentum of particles, and the accelerated particles rotate outward along a spiral orbit until the final energy and beam are led out from the magnetic field.

Later, there are commercial and industrial cyclotrons and some cyclotrons designed for special applications, such as medical cyclotrons for cancer treatment and isotope production. With the development of society, the number of miniaturized medical and commercial cyclotrons increases rapidly, so it is vital to provide customers with high-quality and stable beams.

Beam diagnosis systems, as an important part of the cyclotron, provide various beam parameters for the cyclotron to improve the operation thereof.

When measuring beams in the cyclotron, parameters such as the intensity, position, transverse size and emittance of beams are measured, and the transverse size of the beam mainly refers to the size of a transverse section of the beam.

At present, most measurement methods in China are based on scanning, optics, and beam position monitors. In the process of measurement, due to insufficient internal space of the host, it is difficult to place a beam device and hard to ensure a position accuracy thereof. Moreover, the cavity needs to be opened during the measurement process, resulting in low vacuum inside the host. In addition, the CCD camera can only be installed at one place, so CCD cameras with various sizes and models cannot be placed and fixed at different positions. The beam measurement has problems such as a complicated operation, low precision and poor feasibility. In order to solve the above problems, an adjustable transmission device for measuring transverse parameters of beams is designed.

SUMMARY

To address the above problems such as the difficulty in placing a beam device or low position accuracy due to limited internal space of the host, a low vacuum degree, and complicated operation, and poor feasibility, the present invention provides an adjustable transmission device for measuring transverse parameters of beams.

The object of the present invention is achieved by the following technical solution.

Provided is an adjustable transmission device for measuring transverse parameters of beams, comprising: a CCD transmission support assembly, an external transmission rod, a vacuum observation window, a head assembly, a screwing mechanism and a base; where one end of the CCD transmission support assembly is arranged in the external transmission rod, and the other end thereof is connected with a support block; the support block is provided with a first pin hole, and a slotted set screw with flat point is arranged in the first pin hole, and the support block and a limit block are fixedly connected via a first fastener;

the limit block is configured to support the external transmission rod; a first groove is arranged at an outer side of a rear of the external transmission rod; and a snap ring is arranged in the first groove; the snap ring is matched with one end of the base, and the other end of the base is connected to a CCD fixing plate via a second fastener;

a second groove is arranged in the external transmission rod, and is provided with a first retaining ring for limiting subsequent components, and a side of the first retaining ring is sequentially provided with the vacuum observation window, a second retaining ring, the head assembly, a retaining sleeve and the screwing mechanism.

Further, the CCD transmission support assembly comprises a CCD support rod, an upper support plate and a lower support plate; the CCD support rod is respectively connected to the upper support plate and the lower support plate which are respectively provided with a threaded hole for fixing a CCD camera.

Further, the snap ring is in clearance fit with the external transmission rod, and the base drives the snap ring to move, and the external transmission rod is driven for an axial movement by the snap ring.

Further, the vacuum observation window is made of quartz glass and has a light transmittance of more than 80%; a slot is arranged on an outer surface of the vacuum observation window, and an O-ring for sealing is arranged in the slot.

Further, the head assembly comprises a fluorescent screen, a support base plate, an upper bracket and a lower bracket; the support base plate is bonded with the fluorescent screen, and the support base plate is fixedly connected with the upper bracket and the lower bracket respectively.

Further, the support base plate is perpendicular to the upper bracket and the lower bracket respectively, and an inclined angle between the fluorescent screen and a center of the beam is 90°.

Further, both sides of the head assembly are respectively provided with a second pin hole, and the external transmission rod is provided with a U-shaped groove, through which a cylindrical pin is arranged in the second pin hole.

Further, the head assembly and the vacuum observation window are separated by the second retaining ring.

Further, a front end of the external transmission rod is provided with an internal thread, and an external thread is arranged on one end of the screwing mechanism which is in threaded connection with the front end of the external transmission rod; and the screwing mechanism is separated from the head assembly by the retaining sleeve.

Further, the base is disposed at the rear of the external transmission rod and is mounted on a linear guide rail.

The invention has the following beneficial effects:

In the present invention, the head assembly is provided at a front end of the external transmission rod for measuring parameters, and the CCD camera can be fixedly arranged inside or outside the external transmission rod according to types of the CCD camera. The adjustable transmission device effectively solves the problem of the difficulty in placing a beam device or low position accuracy due to low internal space of the host, meets the requirements of the vacuum degree and the magnetic permeability of inside of the host during the process of transmission of the head assembly, and accurately measures the information of the transverse parameters of beams of the internal accelerating area and lead-out area inside of the host, which is used as a reference for the quality of the beam and the operation of the cyclotron. The adjustable transmission device has the advantages of simplicity, reliability, high feasibility, and simple operation.

BRIEF DESCRIPTION OF THE DRAWINGS

To describe the technical solutions in the embodiments of the present invention more clearly, the following briefly introduces drawings required for the description of the embodiments. Apparently, the accompanying drawings in the following description show merely a part of embodiments of the present invention, and those skilled in the art may still derive other drawings according to these accompanying drawings without creative efforts.

Figure 1:
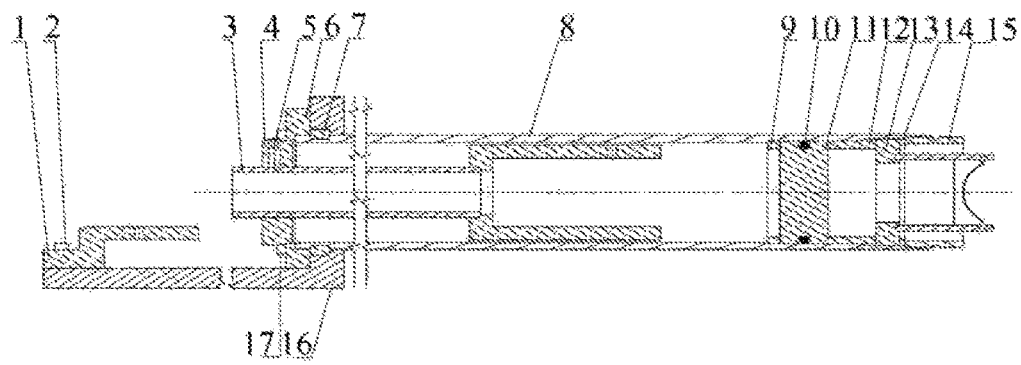
FIG. 1 is a schematic diagram of an adjustable transmission device for measuring transverse parameters of beams according to the present invention.

Reference numerals: 1—CCD fixing plate, 2—first fastener, 3—CCD transmission support assembly, 4—support block, 5—slotted set screw with flat point, 6—limit block, 7—snap ring, 8—external transmission rod, 9—first retaining ring, 10—O-ring, 11—vacuum observation window, 12—second retaining ring, 13—fluorescent head assembly, 131—support base plate, 132—upper bracket, 133—lower bracket, 134—cylinder pin, 14—retaining sleeve, 15—screwing mechanism, 16—base, 17—second fastener, 18—linear guide rail.

DETAILED DESCRIPTION OF EMBODIMENTS

The present invention will be described with reference to the following embodiments and the accompanying drawings, from which the technical solutions of the present invention will be more clear and complete. Apparently, embodiments described are only a part of embodiments of the present invention. Based on the embodiments of the present invention, all other embodiments obtained by those skilled in the art without making any creative efforts shall fall within the scope of the invention.

Figure 2:
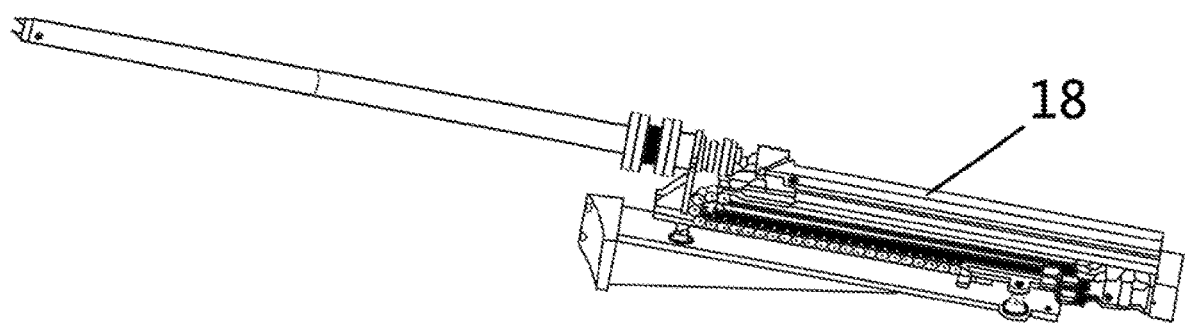
FIG. 2 is a schematic diagram of a transmission mechanism according to the present invention.

As shown in FIGS. 1 and 2, the invention provides an adjustable transmission device for measuring transverse parameters of beams, comprising: a CCD transmission support assembly 3, an external transmission rod 8, a vacuum observation window 11, a head assembly 13, a screwing mechanism 15 and a base 16;

where one end of the CCD transmission support assembly 3 is arranged in the external transmission rod 8, and the other end thereof is connected with a support block 4; the support block 4 is configured to support the CCD transmission support assembly 3; the support block 4 is provided with a first pin hole in which a slotted set screw with flat point 5 is arranged, and the support block 4 and a limit block 6 are fixedly connected via a first fastener 2.

The limit block 6 is configured to support the external transmission rod 8, and a first groove is provided at a rear of the external transmission rod 8; a snap ring 7 is provided in the first groove and is matched with one end of the base 16, and the other end of the base 16 is connected to the CCD fixing plate 1 via a second fastener 17. The base 16 is disposed at a rear of the external transmission rod 8 and is mounted on a linear guide rail 18. The base 16 drives the snap ring 7 to move, and the external transmission rod 8 is driven for axial movement by the snap ring 7; the CCD fixing plate 1 is configured to place a CCD camera, which is mainly used to solve the problem that a large CCD camera cannot be placed inside the external transmission rod 8 in a later stage.

A front end of the external transmission rod 8 is provided with an internal thread, and a second groove is provided in the external transmission rod 8 and is provided with a first retaining ring 9 for limiting subsequent components. A side of the first retaining ring 9 is sequentially provided with the vacuum observation window 11, a second retaining ring 12, the head assembly 13, a retaining sleeve 14 and the screwing mechanism 15. The outer surface of the vacuum observation window 11 is provided with a slot in which an O-ring 10 for sealing is arranged.

The vacuum observation window 11 is made of quartz glass and has a light transmittance of more than 80%, and the outer surface of the vacuum observation window 11 is provided with a third slot for fixing the O-ring 10; the O-ring 10 internally seals the external transmission rod 8 having a diameter of 48 mm.

Figure 3:
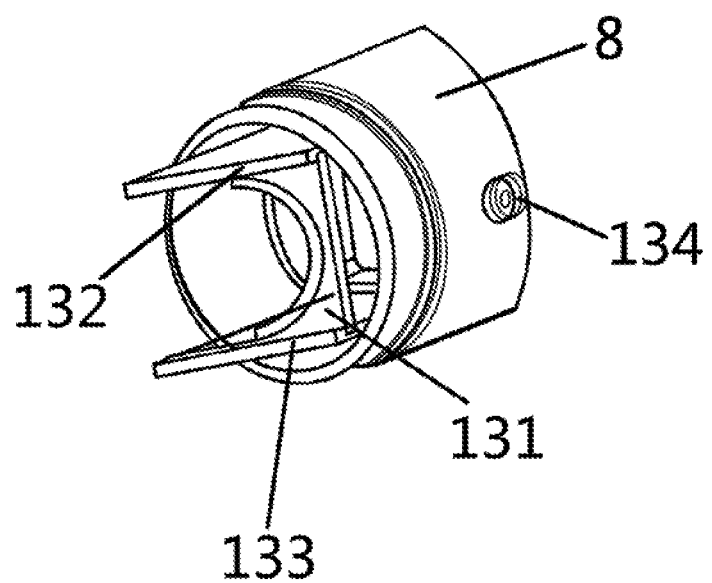
FIG. 3 is an enlarged partial view of the adjustable transmission device for measuring transverse parameters of beams in FIG. 1.

As shown in FIG. 3, the head assembly 13 comprises a fluorescent screen, a support base plate 131, an upper bracket 132 and a lower bracket 133; the support base plate 131 is bonded with the fluorescent screen, and the support base plate 131 is fixedly connected with the upper bracket 132 and the lower bracket 133 respectively. The support base plate 131 is perpendicular to the upper support 132 and the lower support 133 respectively. To ensure the beam bombards the center of the fluorescent screen, the inclined angle between the fluorescent screen and the center of the beam is 90°, thus ensuring the beam spot information processed by the fluorescent screen image signal observed by the CCD camera to be more accurate.

A front end of the external transmission rod 8 is provided with an internal thread and an external thread is provided on one end of the tightening mechanism 15 which is in threaded connection with the front end of the external transmission rod 8; and the screwing mechanism 15 is separated from the head assembly 13 by the second retaining ring 12.

The CDD transmission support assembly 3 comprises a CCD support rod, an upper support plate and a lower support plate; the CCD support rod is respectively connected to the upper support plate and the lower support plate which are respectively provided with a threaded hole for fixing the CCD camera. The CCD support rod is 50 mm away from the vacuum observation window, facilitating the installation of the CCD camera, so that the CCD camera is ensured to obtain a better viewing angle at this distance, and such distance is mainly ensured by the slotted set screw with flat point 5 on the support block 4.

Both sides of the head assembly 13 are respectively provided with a second pin hole, and the external transmission rod 8 is provided with a U-shaped groove. The second pin hole is provided in the U-shaped groove through which a cylindrical pin 134 is arranged in the second pin hole. A width of the U-shaped groove is equal to a diameter of the second pin hole, and the diameter of the cylindrical pin 134 is less than or equal to that of the second pin hole. When the screwing mechanism 15 is rotated, the force thereof is transmitted to the head assembly 13 through the retaining sleeve 14. The head assembly 13 is limited by a cylindrical pin 134 mounted in the U-shaped groove of the external transmission rod 8, and slides axially on the external transmission rod 8. In addition, the first retaining ring 9 is arranged in a second groove provided at the front end of the external transmission rod 8 and is configured to limit the movement of respective components during the screwing process of the screwing mechanism 15.

When a distance between a front end of the CCD drive support assembly 3 and the first retaining ring 9 is 50 mm, the CCD transmission support assembly 3 is compressed and limited by the slotted set screw with flat point 5.

In this embodiment, the CCD camera can be placed between the support plate and the lower support plate at the front end of the CCD transmission support assembly 3; and the CCD 1 camera can also be placed on the base 16.

In the present invention, the head assembly is provided at a front end of the external transmission rod for measuring parameters, and the CCD camera can be fixedly arranged inside or outside the external transmission rod according to types of the CCD camera. The adjustable transmission device effectively solves the problem of the difficulty in placing a beam device or low position accuracy due to low internal space of the host, meets the requirements of the vacuum degree and the magnetic permeability of inside of the host during the process of transmission of the head assembly, and accurately measures the information of the transverse parameters of beams of the internal accelerating area and lead-out area inside of the host, which is used as a reference for the quality of the beam and the operation of the cyclotron. The adjustable transmission device has the advantages of simplicity, reliability, high feasibility, and simple operation.

The above is only for illustrating the concept of the invention, and any modifications, additions or substitutions of the embodiments made by those skilled in the art without departing from the concept of the invention shall fall within the scope of the invention defined by the appended claims.

What is claimed is:

1. An adjustable transmission device for measuring transverse parameters of beams, comprising:
   a CCD transmission support assembly;
   an external transmission rod;
   a vacuum observation window;
   a head assembly;
   a screwing mechanism; and
   a base;
   wherein one end of the CCD transmission support assembly is arranged in the external transmission rod, and the other end thereof is connected with a support block; the support block is provided with a first pin hole, and a slotted set screw with flat point is arranged in the first pin hole; and the support block and a limit block are fixedly connected via a first fastener;
   the limit block is configured to support the external transmission rod; a first groove is arranged at an outer side of a rear of the external transmission rod, and a snap ring is arranged in the first groove; the snap ring is matched with one end of the base, and the other end of the base is connected to a CCD fixing plate via a second fastener; and
   a second groove is provided in the external transmission rod and is provided with a first retaining ring for limiting subsequent components, and a side of the first retaining ring is sequentially provided with the vacuum observation window, a second retaining ring, the head assembly, a retaining sleeve and the screwing mechanism.

2. The adjustable transmission device of claim 1, wherein the CCD transmission support assembly comprises a CCD support rod, an upper support plate and a lower support plate; the CCD support rod is respectively connected to the upper support plate and the lower support plate which are respectively provided with a threaded hole for fixing a CCD camera.

3. The adjustable transmission device of claim 1, wherein the snap ring is in clearance fit with the external transmission rod, and the base drives the snap ring to move, and the external transmission rod is driven for an axial movement by the snap ring.

4. The adjustable transmission device of claim 1, wherein the vacuum observation window is made of quartz glass and has a light transmittance of more than 80%; a slot is provided on an outer surface of the vacuum observation window, and an O-ring for sealing is arranged in the slot.

5. The adjustable transmission device of claim 1, wherein the head assembly comprises a fluorescent screen, a support base plate, an upper bracket and a lower bracket; the support base plate is bonded with the fluorescent screen, and the support base plate is fixedly connected with the upper bracket and the lower bracket respectively.

6. The adjustable transmission device of in claim 5, wherein the support base plate is perpendicular to the upper bracket and the lower bracket respectively, and an inclined angle between the fluorescent screen and a center of the beams is 90°.

7. The adjustable transmission device of claim 1, wherein both sides of the head assembly are respectively provided with a second pin hole, and the external transmission rod is provided with a U-shaped groove, through which a cylindrical pin is arranged in the second pin hole.

8. The adjustable transmission device of claim 1, wherein the head assembly and the vacuum observation window are separated by the second retaining ring.

9. The adjustable transmission device of claim 1, wherein a front end of the external transmission rod is provided with an internal thread and an external thread is provided on one end of the screwing mechanism which is in threaded connection with the front end of the external transmission rod; and the screwing mechanism is separated from the head assembly by the retaining sleeve.

10. The adjustable transmission device of claim 1, wherein the base is disposed at the rear of the external transmission rod and is mounted on a linear guide rail.

* * * * *